United States Patent
Kim et al.

(10) Patent No.: US 10,339,322 B2
(45) Date of Patent: Jul. 2, 2019

(54) METHOD AND APPARATUS FOR IDENTIFYING SECURITY VULNERABILITY IN BINARY AND LOCATION OF CAUSE OF SECURITY VULNERABILITY

(71) Applicant: KOREA INTERNET & SECURITY AGENCY, Jeollanam-do (KR)

(72) Inventors: Hwan Kuk Kim, Jeollanam-do (KR); Tae Eun Kim, Jeollanam-do (KR); Sang Hwan Oh, Jeollanam-do (KR); Soo Jin Yoon, Jeollanam-do (KR); Jee Soo Jurn, Jeollanam-do (KR); Geon Bae Na, Jeollanam-do (KR)

(73) Assignee: KOREA INTERNET AND SECURITY AGENCY, Jeollan-Do (KR)

( * ) Notice: Subject to any disclaimer, the term of this patent is extended or adjusted under 35 U.S.C. 154(b) by 0 days.

(21) Appl. No.: 16/036,396

(22) Filed: Jul. 16, 2018

(65) Prior Publication Data

US 2019/0147168 A1 May 16, 2019

(30) Foreign Application Priority Data

Nov. 15, 2017 (KR) .................. 10-2017-0152288

(51) Int. Cl.
 *G06F 11/00* (2006.01)
 *G06F 12/14* (2006.01)
 (Continued)

(52) U.S. Cl.
 CPC ...... *G06F 21/577* (2013.01); *G06F 2221/034* (2013.01)

(58) Field of Classification Search
 None
 See application file for complete search history.

(56) References Cited

U.S. PATENT DOCUMENTS 8,584,239 B2 * 11/2013 Aziz .................. G06F 21/554
 726/24
8,656,496 B2 * 2/2014 Artzi ................. G06F 21/00
 717/127

(Continued)

FOREIGN PATENT DOCUMENTS

KR 101530132 B1 6/2015
KR 20170096440 A 8/2017

OTHER PUBLICATIONS

Sungho Kim et al., "Analyzing Vulnerable Software Code Using Dynamic Taint and SMT Solver," KIISE Transactions on Computing Practices, vol. 21, No. 3, pp. 257-262, Mar. 2015.

(Continued)

*Primary Examiner* — Lynn D Feild
*Assistant Examiner* — Vadim Savenkov
(74) *Attorney, Agent, or Firm* — K&L Gates LLP (57) ABSTRACT

Provided are a binary vulnerability analysis method performed by a computing device is provided, and the binary vulnerability analysis method includes a primary execution step of recording a symbolic constraint of a vulnerability associated with an execution flow path causing a crash to a target binary to be analyzed and a suspicious element on the execution flow path by performing taint analysis through a primary execution of the target binary; and a secondary execution step of performing a secondary execution, which is a symbolic execution, on the execution flow path and, if an instruction satisfying the symbolic constraint is found, determining that the vulnerability exists in the target binary by comparing the suspicious element and the found instruction.

13 Claims, 10 Drawing Sheets

(51) Int. Cl.
    *G06F 12/16*     (2006.01)
    *G08B 23/00*     (2006.01)
    *G06F 21/57*     (2013.01)

(56) References Cited

U.S. PATENT DOCUMENTS

| | | | |
|---|---|---|---|
| 8,850,581 B2 * | 9/2014 | Wang | G06F 21/566 |
| | | | 726/23 |
| 9,367,681 B1 * | 6/2016 | Ismael | G06F 21/52 |
| 2007/0094734 A1 * | 4/2007 | Mangione-Smith | |
| | | | G06F 21/564 |
| | | | 726/24 |
| 2013/0290936 A1 * | 10/2013 | Rhee | G06F 11/3636 |
| | | | 717/128 |
| 2013/0312103 A1 * | 11/2013 | Brumley | G06F 21/577 |
| | | | 726/25 |

OTHER PUBLICATIONS

Notice of Allowance issued in related Korean Patent Application No. KR10-2017-0152288 dated Oct. 26, 2018.

* cited by examiner

METHOD AND APPARATUS FOR IDENTIFYING SECURITY VULNERABILITY IN BINARY AND LOCATION OF CAUSE OF SECURITY VULNERABILITY

CROSS REFERENCE TO RELATED APPLICATIONS

This application claims priority under 35 U.S.C. § 119 to Korean Patent Application No. 10-2017-0152288, filed on Nov. 15, 2017, the disclosure of which is incorporated herein by reference in its entirety.

BACKGROUND

Field

The present disclosure relates to a method and apparatus for identifying a security vulnerability in a binary and the location of the cause of the security vulnerability, and more particularly, to an automated method of identifying a vulnerability in an executable binary and the location of the cause of the vulnerability.

Description of the Related Art

Software is distributed in the form of an executable binary (hereinafter, "binary"), which is the product of compilation of software. Software is executed by loading a binary in a memory of a storage device and fetching some instructions of the binary from the memory to a processor.

Meanwhile, a variety of methodologies for identifying a vulnerability present in a binary through the analysis of the binary have been proposed. Examples of the vulnerability include a buffer overflow, an integer overflow, a memory exception, a race condition, a malformed-input, a symbolic link, and a null pointer. Due to the vulnerability, some functions of the binary may be tampered with for improper purposes or may cause security problems to the system in which the binary is executed. Thus, a vulnerability in a binary executed in a system that is highly of security importance needs to be quickly and precisely identified.

However, currently, a vulnerability present in a binary and the location of the cause of the vulnerability are found simply based on the expertise from experts. Thus, there is a risk of a vulnerability simply not being found or not being able to be quickly found because of a shortage of expertise.

Therefore, it is necessary to provide a technique for detecting a vulnerability present in a binary and the location of the cause of the vulnerability in an automated manner.

SUMMARY

Exemplary embodiments of the present disclosure provide a method and apparatus for identifying a vulnerability present in a binary in an automated manner by dynamically analyzing the binary, instead of analyzing attacks on the binary.

Exemplary embodiments of the present disclosure also provide a method and apparatus for not only identifying a vulnerability present in a binary, but also locating the cause of the vulnerability, in an automated manner.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, a binary vulnerability analysis method performed by a computing device is provided, and the binary vulnerability analysis method may include a primary execution step of recording a symbolic constraint of a vulnerability associated with an execution flow path causing a crash to a target binary to be analyzed and a suspicious element on the execution flow path by performing taint analysis through a primary execution of the target binary; and a secondary execution step of performing a secondary execution, which is a symbolic execution, on the execution flow path and, if an instruction satisfying the symbolic constraint is found, determining that the vulnerability exists in the target binary by comparing the suspicious element and the found instruction.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Exemplary embodiments of the present disclosure will hereinafter be described with reference to the accompanying drawings.

Figure 1:
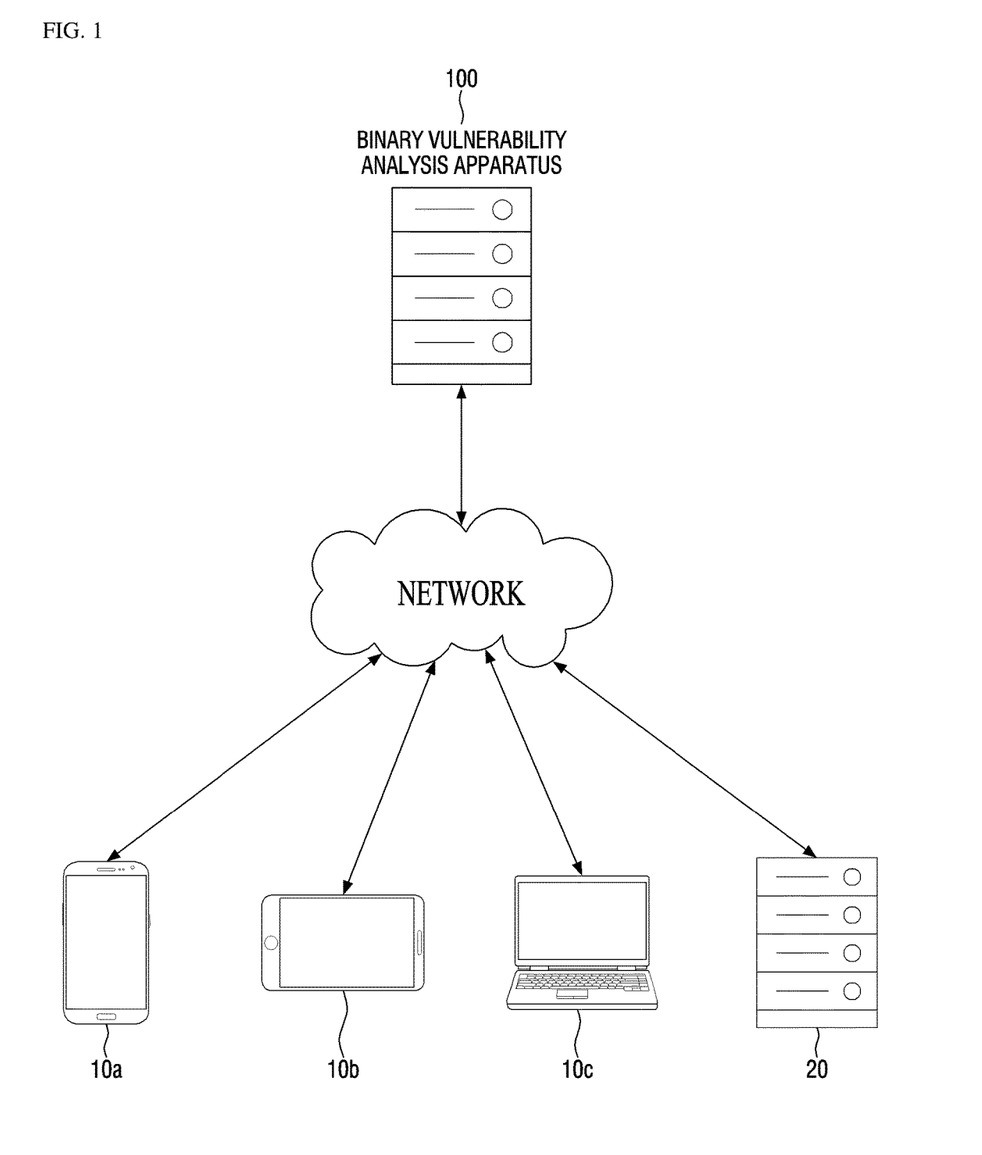
FIG. 1 is a schematic view illustrating a binary vulnerability analysis system according to an exemplary embodiment of the present disclosure.

FIG. 1 is a schematic view illustrating a binary vulnerability analysis system according to an exemplary embodiment of the present disclosure. Referring to FIG. 1, the binary vulnerability analysis system may include a binary vulnerability analysis apparatus 100, which serves as a server, and one or more electronic devices 10a, 10b, 10c, and 20, which serve as clients. The clients 10a, 10b, 10c, and 20 may include user terminals 10a, 10b, and 10c such as smartphones, tablet personal computers (PCs), laptop computers, or PCs, and may also include a server device 20 providing other services.

The binary vulnerability analysis apparatus 100 and the clients 10a, 10b, 10c, and 20, which are all electronic devices serving as clients, may be, for example, computing devices equipped with operation processors.

In the binary vulnerability analysis system, each of the clients 10a, 10b, 10c, and 20 may provide a target binary to be analyzed to the binary vulnerability analysis apparatus 100 and may receive the result of analysis performed by the binary vulnerability analysis apparatus 100. The binary vulnerability analysis apparatus 100 may analyze the target binary in an automated manner and may identify a vulnerability present in the target binary. In one exemplary embodiments, the binary vulnerability analysis apparatus 100 may locate the cause of the identified vulnerability. Also, in one exemplary embodiment, the binary vulnerability analysis apparatus 100 may locate the cause of a crash in the target binary.

The binary vulnerability analysis apparatus 100 may collect the target binary, instead of receiving the target binary from the clients 10a, 10b, 10c, and 20.

The binary vulnerability analysis apparatus 100 may provide the result of the analysis of the target binary to each of the clients 10a, 10b, 10c, and 20 or may manage the result of the analysis of the target binary in a database (DB).

Figure 2:
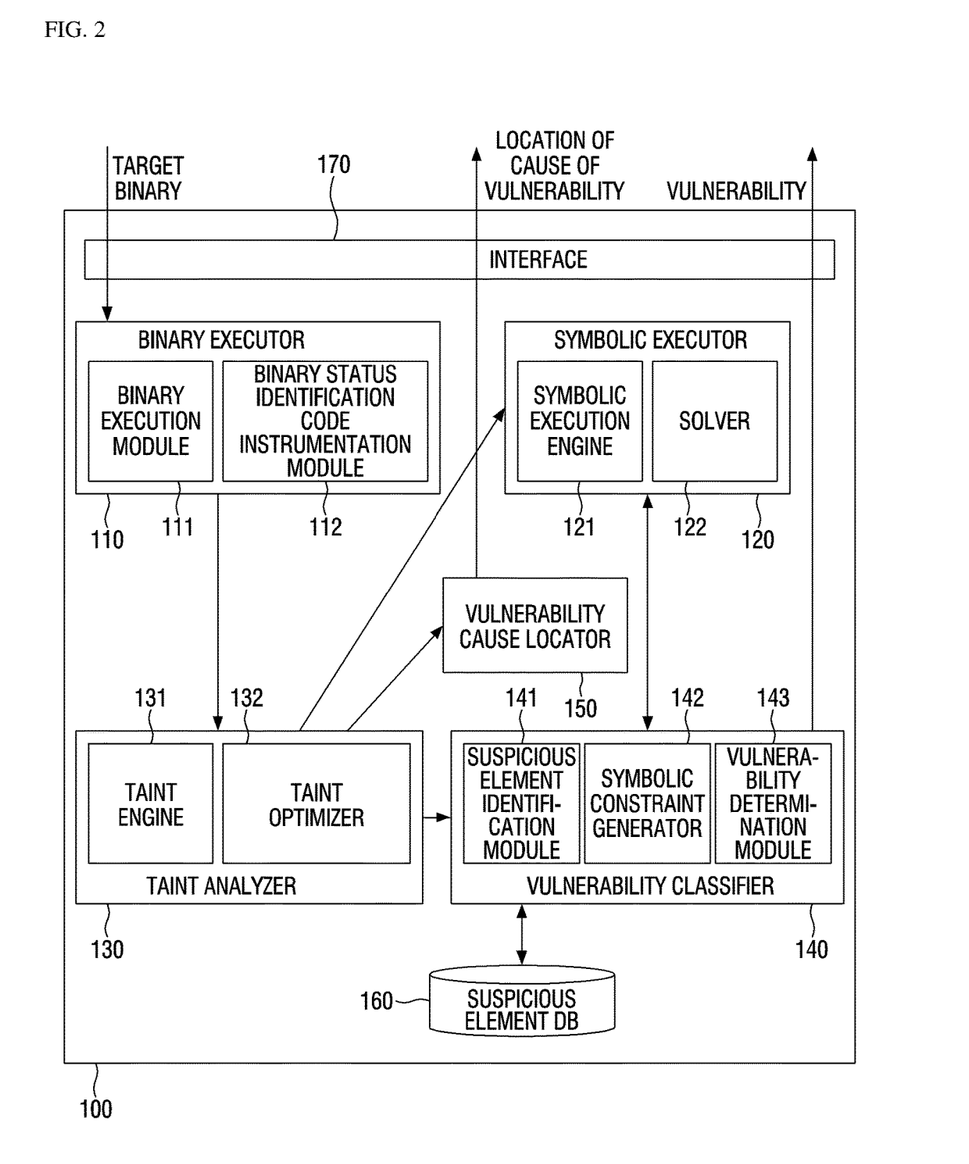
FIG. 2 is a block diagram of a binary vulnerability analysis apparatus according to an exemplary embodiment of the present disclosure.

The structure and operations of the binary vulnerability analysis apparatus 100 will hereinafter be described with reference to FIG. 2. Referring to FIG. 2, the binary vulnerability analysis apparatus 100 may include at least one of a binary executor 110, a symbolic executor 120, a taint analyzer 130, a vulnerability classifier 140, a suspicious element DB 160, a vulnerability cause locator 150, and an interface 170. The interface 170 may be a software or hardware module mediating the input of data to, or the output of data from, the binary vulnerability analysis apparatus 100.

The binary executor 110, the symbolic executor 120, the taint analyzer 130, the vulnerability classifier 140, the suspicious element DB 160, and the vulnerability cause locator 160 may be implemented as computing devices that are physically separate from one another, or at least some of the binary executor 110, the symbolic executor 120, the taint analyzer 130, the vulnerability classifier 140, the suspicious element DB 160, and the vulnerability cause locator 160 may be incorporated into a single computing device as software or hardware modules.

The binary executor 110 includes a binary execution module 111 receiving and executing the target binary and a binary status identification code instrumentation module 112 inserting code for identifying binary status information.

The binary execution module 111 executes the target binary in accordance with a given environment. The binary execution module 111 may execute the target binary using an execution parameter provided along with the target binary. The execution parameter is data identified as causing a crash, and may be input to a binary internal logic during the execution of the target binary.

The binary status identification code instrumentation module 112 provides a binary code instrumentation function for binary control and for information acquisition. Code inserted into the target binary may output the internal status of the target binary in accordance with the execution of the target binary.

The taint analyzer 130 determines whether factors are affected by a particular factor and performs taint analysis for identifying the cause and the influence of a problem using data tainted with suspicious elements. Various well-known taint analysis methods may be employed. For more information on taint analysis, visit http://valgrind.org/docs/newsome2005.pdf.

The taint analyzer 130 may include a taint engine 131, which is a main logic performing taint analysis, and a taint optimizer 132 for applying an optimized method to patterns that are not detected by an existing taint engine. The existing taint engine determines assembly code as being tainted only if the source (hereinafter, "taint source") and the destination of the assembly code are connected. The taint optimizer 132 uses a tainted element as a conditional statement and performs logic for applying an optimized method so that elements affected by the conditional statement can also be treated as taint. For more information on this type of optimization method, see the article entitled "DTA++: Dynamic Taint Analysis with Targeted Control-Flow Propagation". The taint source may be a part loading the execution parameter of the target binary. A method of setting the taint source will be described later.

The vulnerability classifier 140 determines an expected vulnerability in the target binary. The vulnerability classifier 140 may include a suspicious element checker 141, a symbolic constraint generator 142, and a vulnerability determination module 143.

The vulnerability classifier 140 receives taint analysis result data obtained by performing taint analysis on the target binary from the taint analyzer 130, reanalyzes the received data, sets a condition for a secondary execution for identifying a vulnerability in the target binary using the result of the reanalysis, and provides the condition to the symbolic executor 120. That is, the secondary execution is performed mainly by the symbolic executor 120.

The elements illustrated in FIG. 2 are interoperable with one another when being executed, and thus do not necessarily need to be executed earlier or later than one another. The vulnerability classifier 140 performs similar functions to those of a service daemon.

The suspicious element identification module 141 may determine whether a tainted element (such as a tainted operand, a tainted memory address, or a tainted register) from the taint source matches an existing vulnerability. Specifically, the suspicious element identification module 141 may determine whether the tainted element is a suspicious element based on at least one of the presence or absence of an operand that may be exploited, an operand pattern, an instruction pattern, and a pseudo code pattern. When the assembly language of the target binary is convertible into pseudo code, the pseudo code is analyzed. The suspicious element identification module 141 may obtain information regarding the existing vulnerability from the suspicious element DB 160.

The symbolic constraint generator 142 may set a symbolic constraint, which can identify a vulnerability corresponding to a suspicious element detected by the suspicious element identification module 141, and provides the symbolic constraint to the symbolic executor 120. The symbolic constraint imparts a conditional expression to an execution flow path to be subjected to a symbolic execution.

The symbolic executor 120 performs a symbolic execution on the target binary. A symbolic execution of a binary is to replace certain values used in the binary with symbolic variables and is similar to developing an equation using unknowns. The symbolic execution engine 121 replaces values with symbols during the execution of the target binary. Thus, a branch condition according to symbols is identified from the conditional statement included in the target binary. A solver 122 finds the values of symbols for a particular execution flow path.

If the target binary is not a simple binary, the symbolic executor 120 need a considerable amount of computing resources to compute the values of symbols for all possible execution flow paths of the target binary. The binary vulnerability analysis apparatus 100 does not need to identify all possible execution flow paths of the target binary, but needs to identify an execution flow path where a crash occurs, and the execution flow path where a crash occurs is pointed to by a taint record of the taint analyzer 130. Thus, the symbolic executor 120 performs a symbolic execution only on the execution flow path pointed to by the taint record, and checks if an instruction satisfying the symbolic constraint provided by the vulnerability classifier 140 is found during the symbolic execution. If an instruction satisfying the symbolic constraint is found, the symbolic executor 120 notifies the vulnerability classifier 140 of the found instruction. In response to being notified of the found instruction by the symbolic executor 120, the vulnerability determination module 143 of the vulnerability classifier 140 determines whether a vulnerability exists in the target binary.

The determination of a vulnerability will hereinafter be described.

When an execution parameter for causing a crash is input to the target binary, it can be identified, from the taint record, that an execution takes place in a first execution flow path, and a first suspicious element present in the first execution flow path may be identified by the suspicious element identification module 141. The suspicious element identification module 141 references known vulnerability information present in the suspicious element DB 160.

A vulnerability corresponding to the first suspicious element is already stored in the suspicious element DB 160. If the vulnerability corresponding to the first suspicious element is a buffer overflow, the symbolic constraint generator 142 generates a symbolic constraint that causes an overflow in the first execution flow path.

Thereafter, the symbolic executor 120 performs a symbolic execution on the first execution flow path. Then, if an operand satisfying the generated symbolic constraint is found, the symbolic executor 120 notifies the vulnerability determination module 143 of the found operand.

That an instruction satisfying a symbolic constraint causing a buffer overflow is found means that there is a possibility that a buffer overflow vulnerability exists in the target binary. The vulnerability determination module 143 finally determines whether there exists a buffer overflow vulnerability in the target binary through a comparison between the instruction satisfying the symbolic constraint and the first suspicious element.

For example, if the instruction satisfying the symbol constraint and the first suspicious element are at the same location, the vulnerability determination module 143 may finally determine whether a buffer overflow vulnerability exists in the target binary. Also, for example, if the instruction satisfying the symbol constraint is executed after the execution of the first suspicious element, the vulnerability determination module 143 may finally determine whether a buffer overflow vulnerability exists in the target binary.

The vulnerability cause locator 150 locates the cause of a vulnerability. Once the taint analysis performed by the taint analyzer 130 and the symbolic execution performed by the symbolic executor 120 are complete, the vulnerability cause locator 150 locates the cause of the vulnerability present in the target binary based on the results of the taint analysis and the symbolic execution.

The vulnerability classifier 140 may output information regarding the vulnerability determined to be present in the target binary via the interface 170.

For example, the vulnerability cause locator 150 identifies a tainted operand associated with the location where a crash has occurred and determines the time when the value of the tainted operand changes to a crash causing value having caused the crash (i.e., the value of an operand or a register at the time of a forceful determination caused by the crash during the primary execution for taint analysis) as the location of a vulnerability.

Also, for example, if the crash causing value is unidentifiable or if no change in the crash causing value is detected, the vulnerability cause locator 150 may determine the location of a suspicious element (identified by the suspicious element identification module 141) closest to the location, on an execution flow path, of the occurrence of the forced termination caused by the crash as the location of a vulnerability. Then, the vulnerability cause locator 150 may output the result of the determination via the interface 170.

A binary vulnerability analysis method according to an exemplary embodiment of the present disclosure will hereinafter be described with reference to FIGS. 3 through 8. The binary vulnerability analysis method may be performed by an electronic device. The electronic device may be, for example, a computing device. The computing device may be, for example, the binary vulnerability analysis apparatus 100 that has been described above with reference to FIGS. 1 and 2. The binary vulnerability analysis method may include at least some operations performed by the binary vulnerability analysis apparatus 100. Thus, although not specifically mentioned, some operations of the binary vulnerability analysis apparatus 100 may be included in the binary vulnerability analysis method. Also, unless specified otherwise, steps of the binary vulnerability analysis method may be understood as being performed by the binary vulnerability analysis apparatus 100.

The binary vulnerability analysis method will hereinafter be described with reference to FIG. 3.

Figure 3:
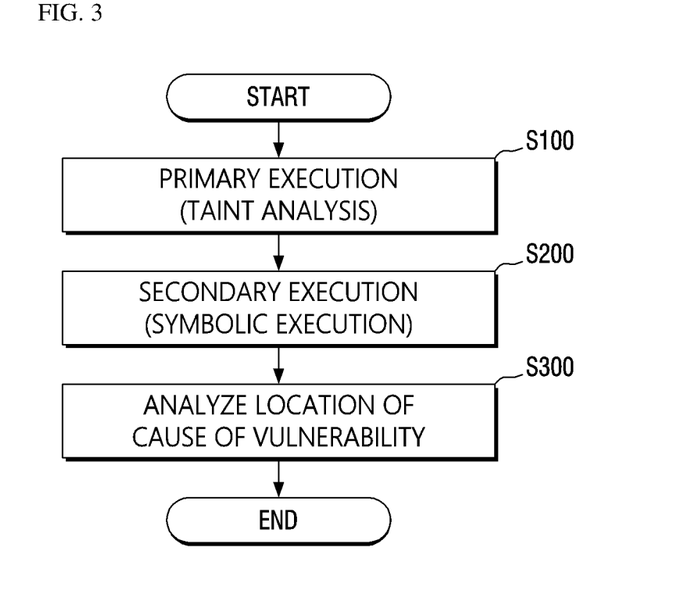
FIG. 3 is a flowchart illustrating a binary vulnerability analysis method according to an exemplary embodiment of the present disclosure.

Referring to FIG. 3, in S100, a primary execution of a target binary to be analyzed is performed. An execution parameter causing a crash to the target binary is input. A taint record, which is the result of taint analysis using the input execution parameter as a taint source, and a suspicious element determined to exist on an execution flow path of the target binary are output. Also, a symbolic constraint for a vulnerability corresponding to the suspicious element is output. The primary execution may be performed by the binary executor 110, the taint analysis 130, and the vulnerability classifier 140 of FIG. 2 and will be described later in detail with reference to FIGS. 4 through 6.

In S200, a secondary execution of the target binary is performed by performing a symbolic execution only on the execution flow path identified from the primary execution using the taint record output in S100. If an instruction satisfying the symbolic constraint output in S100 is found during the symbolic execution, a determination is finally made as to whether a vulnerability exists in the target binary by comparing the found instruction and the suspicious element output in S100. The secondary execution may be performed by the binary executor 110, the symbolic executor 120, and the vulnerability classifier 140 of FIG. 2 and will be described later in detail with reference to FIG. 7.

In S300, the cause of a vulnerability is located using at least one of the result of the primary execution and the result of the secondary execution. S300 will be described later in detail with reference to FIG. 8.

S100 will hereinafter be described with reference to FIG. 4.

Figure 4:
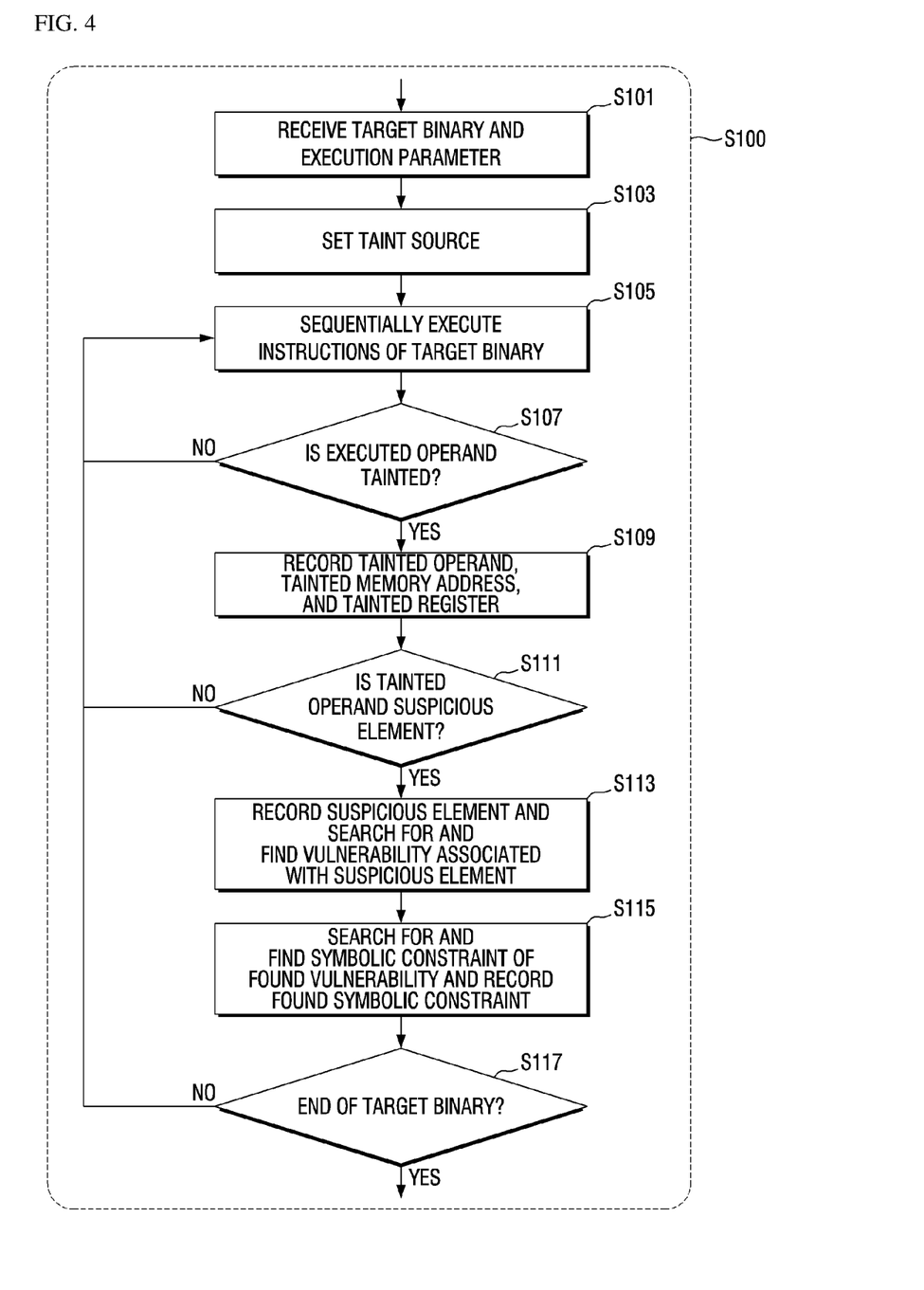
FIG. 4 is a detailed flowchart illustrating S100 of FIG. 3.

Referring to FIG. 4, in S101, the target binary is executed using an execution parameter causing a crash to the target binary. In S103, a taint source is set for performing taint analysis. The process of the taint source being tainted with another operand during the execution of the target binary may be tracked, and the result of the tracking may be recorded or output as a taint record. The setting of the taint source, i.e., S103, will hereinafter be described with reference to FIG. 5.

Figure 5:
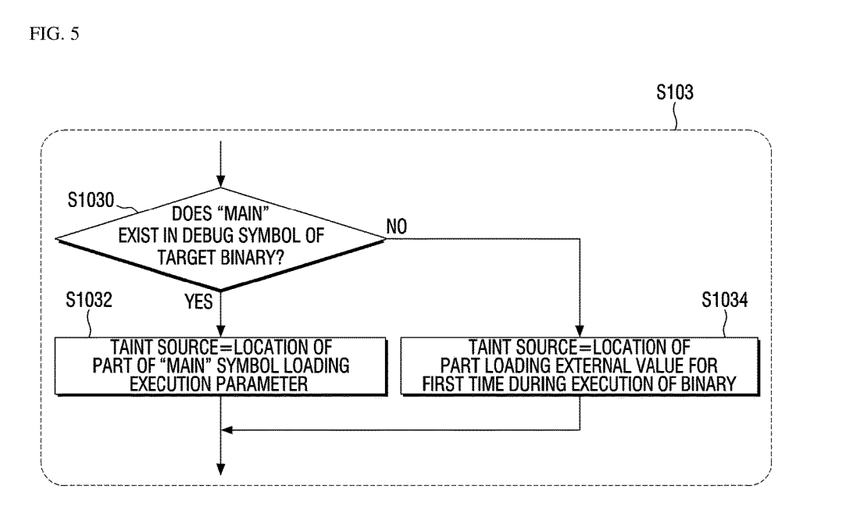
FIG. 5 is a further detailed flowchart illustrating S103 of FIG. 4.

Referring to FIG. 5, the setting of the taint source is dependent upon whether the "main" symbol exists in the debug symbol of the target binary. Specifically, in S1030, a determination is made as to whether the "main" symbol exists in the debug symbol of the target binary, and in S1032, if a determination is made that the "main" symbol exists in the debug symbol of the target binary, the taint source may be set to the location (or the address) of an instruction calling (or loading) an execution parameter, among the instructions corresponding to the "main" symbol.

On the other hand, if a determination is made that the "main" symbol does not exist in the debug symbol of the target binary, it may be difficult to determine which execution parameter is to be to loaded from which part of the target binary until the target binary is actually executed. Thus, in S1034, the taint source is set to the location of an instruction calling an external value for the first time during the execution of the target binary because the external value that is called for the first time is highly likely to be an execution parameter.

Referring again to FIG. 4, in S105, instructions of the target binary are sequentially executed, and in S107, a determination is made as to whether operands included in the instructions are tainted with previously-executed operands. Only instructions including tainted operands may become the target of analysis. Thus, in S109, the memory addresses of tainted operands or registers or instructions associated with the tainted operands or registers are recorded. As a result, a taint record is generated from the taint source, as shown in Table 1 below.

TABLE 1

| Taint Source: 0x400a08: mov eax, dword ptr [rbp-0xc] | |
| --- | --- |
| 0x400a08: | mov eax, dword ptr [rbp-0xc] |
| 0x400a0b: | movzx eax, al |
| 0x400a0e: | test eax, eax |
| 0x400b0f: | mov eax, dword ptr [rbp-0xc] |
| 0x400b12: | and eax, 0xff00 |
| 0x400b17: | test eax, eax |
| 0x400b5b: | mov eax, dword ptr [rbp-0xc] |
| 0x400b5e: | and eax, 0xff0000 |
| 0x400b63: | test eax, eax |

In S111, a determination is made as to whether instructions including tainted operands are suspicious elements. S111 may be performed by, for example, the suspicious element identification module 141. S111 will hereinafter be described in detail with reference to FIG. 6.

Figure 6:
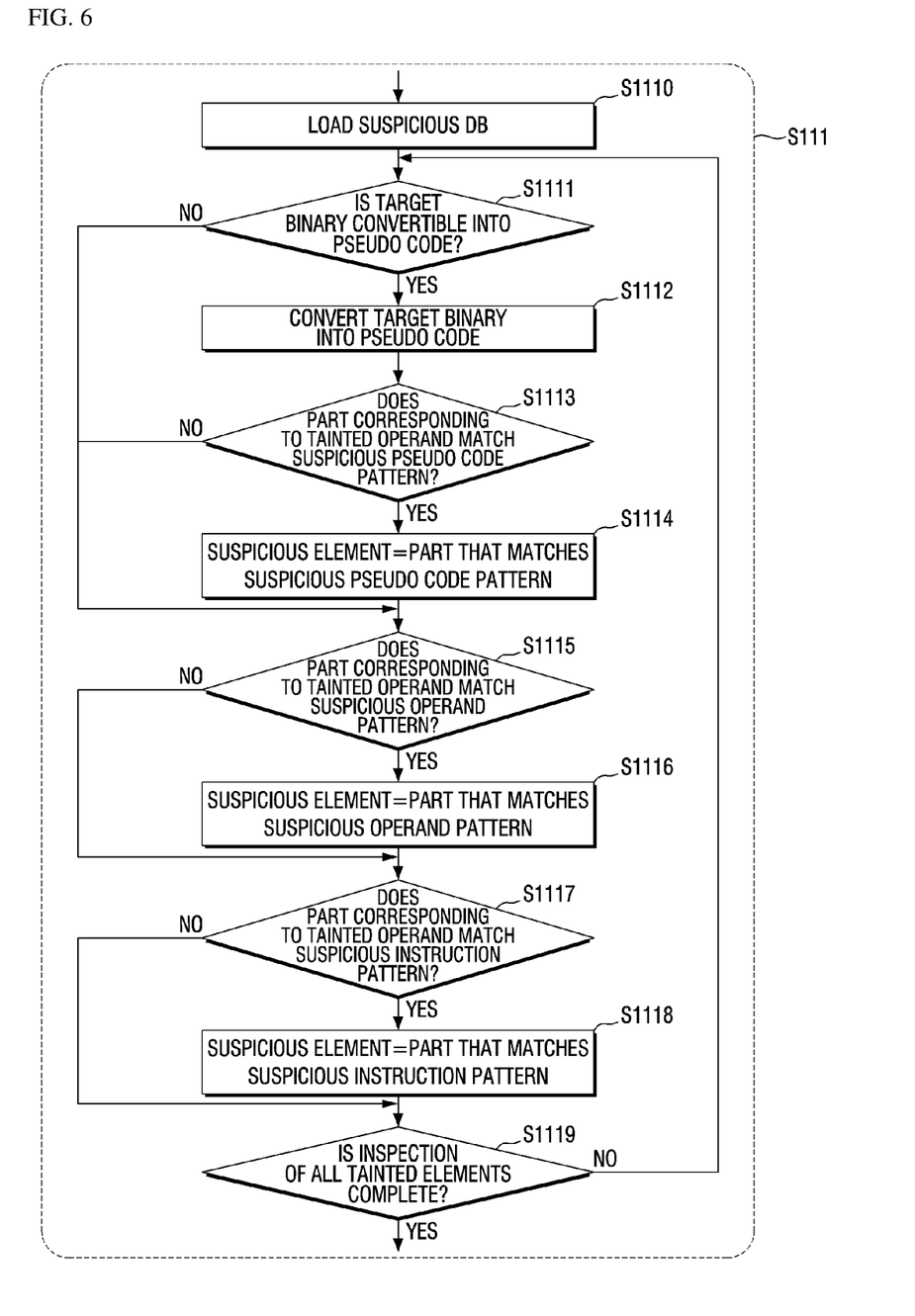
FIG. 6 is a further detailed flowchart illustrating S111 of FIG. 4.

Referring to FIG. 6, in S1110, at least one of a suspicious instruction pattern, a suspicious operand pattern, and a suspicious pseudo code pattern is fetched from the suspicious element DB 160. In the suspicious element DB 160, the suspicious instruction pattern, the suspicious operand pattern, and the suspicious pseudo code pattern are stored in association with a corresponding type of vulnerability.

In S1111, a determination is made as to whether the target binary is convertible into pseudo code. In S1112, if the target binary is convertible into pseudo code, the target binary is converted into pseudo code. Thereafter, in S1113, a determination is made as to whether a part of the pseudo code corresponding to an instruction including a tainted operand matches the suspicious pseudo code pattern. Then, in S1114, if the part of the pseudo code corresponding to an instruction including a tainted operand matches the suspicious pseudo code pattern, the corresponding part of the pseudo code is recorded as a suspicious element.

In S1115, a determination is made as to whether a part of the pseudo code corresponding to a tainted operand matches the suspicious operand pattern. Then, in S1116, if the part of the pseudo code corresponding to a tainted operand matches the suspicious operand pattern, the corresponding part of the pseudo code is recorded as a suspicious element.

In S1117, a determination is made as to whether an instruction corresponding to a tainted operand matches the suspicious instruction pattern. Then, in S1118, if the instruction corresponding to the tainted operand matches the suspicious instruction pattern, the corresponding instruction is recorded as a suspicious element. For example, a determination may be made that an instruction "mov ecx, A" matches the suspicious instruction pattern if "A" in the instruction "mov ecx, A" exceeds a predetermined threshold value, or if an unusually large index value is input to the "ecx" register, which is a commonly used for an index search.

In S1119, a determination is made as to whether the inspection of all the tainted elements is complete. Then, if a determination is made that the inspection of all the tainted elements is yet to be complete, the binary vulnerability analysis method returns to S1111. On the other hand, if a determination is made that the inspection of all the tainted elements is complete, S111 ends.

Referring again to FIG. 4, in S113, if an instruction including a tainted operand is determined as being a suspicious element in S111, the corresponding suspicious element is recorded, and a vulnerability associated with the corresponding suspicious element is searched for from the suspicious element DB 160. Multiple suspicious elements may be detected from the target binary, and the names, the locations (or the memory addresses), and the related vulnerabilities of the multiple suspicious elements may be recorded in association with one another, as shown in Table 2 below.

TABLE 2

| Suspicious Element | Location | Related Vulnerability |
| --- | --- | --- |
| strcpy | 0x400x02 | Buffer Overflow |
| Call malloc | 0x400c5e | Memory Exception |

In S115, the symbolic constraint of the suspicious element recorded in S113 is searched for and recorded.

In one exemplary embodiment, the symbolic constraint of the recorded suspicious element may correspond one-to-one to a vulnerability related to the recorded suspicious element. For example, if the recorded suspicious element is null pointer error, the symbolic constraint of the recorded suspicious element may be as follows:

pc>higher_boundary_binary|pc<higher_boundary_binary&last_memory==null where "pc" denotes that a value of the PC register indicates the outside of a binary executable area and "null" means that the last accessed memory value is "null".

Alternatively, the symbolic constraint of the recorded suspicious element may be generated in consideration of the recorded suspicious element, the vulnerability associated with the recorded suspicious element, and an execution flow path corresponding to the location of the recorded suspicious element.

In S117, if there are no instructions of the target binary left to be executed, data regarding the recorded suspicious element and the symbolic constraint of the recorded suspicious element is output.

The secondary execution, i.e., S200, will hereinafter be described with reference to FIG. 7.

Figure 7:
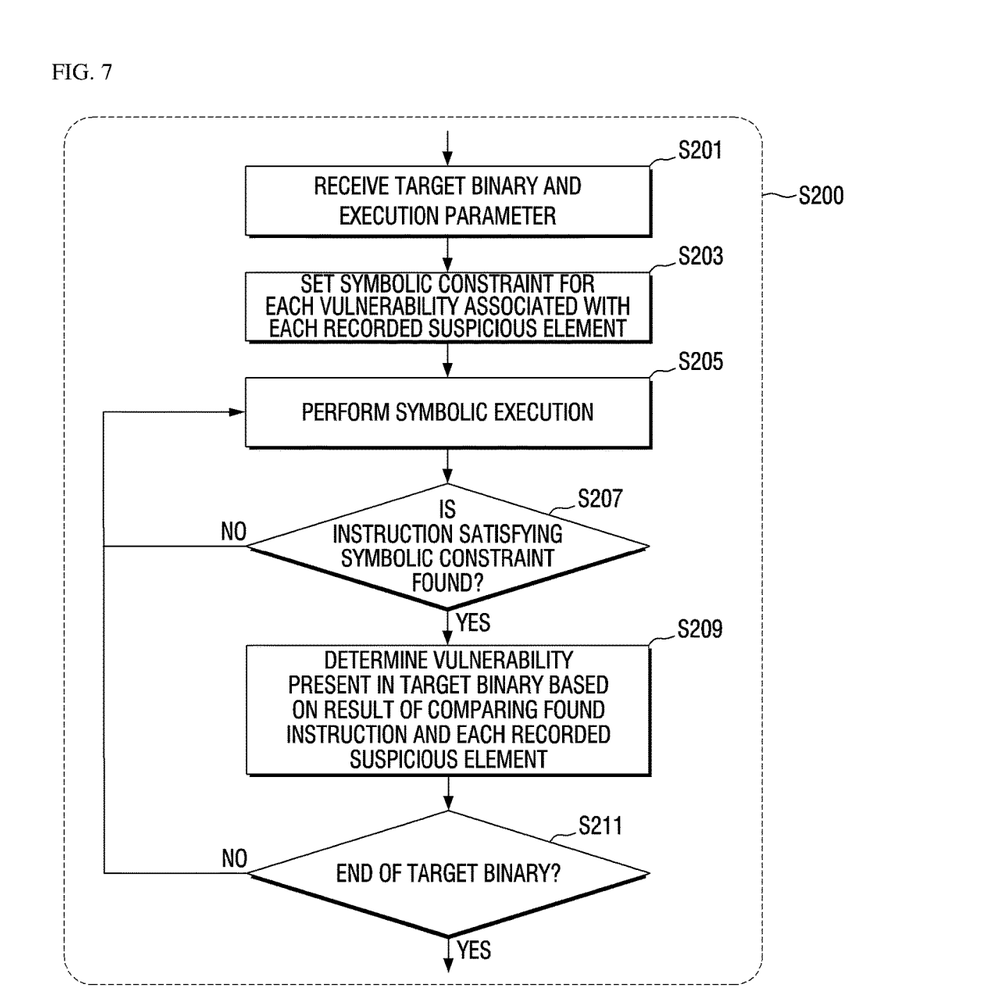
FIG. 7 is a detailed flowchart illustrating S200 of FIG. 3.

Referring to FIG. 7, in S201, the target binary and the execution parameter are provided, and in S203, the symbolic constraint of each suspicious element, output as the result of the primary execution, is set in the symbolic executor 120. That is, multiple symbolic constraints may be set in the symbolic executor 120 in parallel.

In S205, instructions are sequentially subjected to a symbolic execution. As already described above, there is no need to identify all possible execution flow paths of the target binary. Thus, a symbolic execution may be performed only on an execution flow path pointed to by the taint record obtained by the primary execution, and a determination may be made as to whether instructions satisfying the symbolic constraints set in the symbolic executor 120 are found during the symbolic execution.

During the symbolic execution, in S207, if an instruction satisfying one of the set symbolic constraints is found, a vulnerability present in the target binary is determined through a comparison of the found instruction with each recorded suspicious element. In one exemplary embodiment, if an instruction satisfying one of the set symbolic constraints is found and if the found instruction and a recorded suspicious element are at the same location, a determination may be made that there exists a vulnerability in the target binary. In another exemplary embodiment, if the found instruction is an operand executed after the execution of a recorded suspicious element, a determination may be made that a vulnerability exists in the target binary.

In S211, if there are no instructions of the target binary left to be executed, information regarding the vulnerability determined to exist in the target binary is output, and the secondary execution ends.

The locating of the cause of a vulnerability, i.e., S300, will hereinafter be described with reference to FIG. 8.

Figure 8:
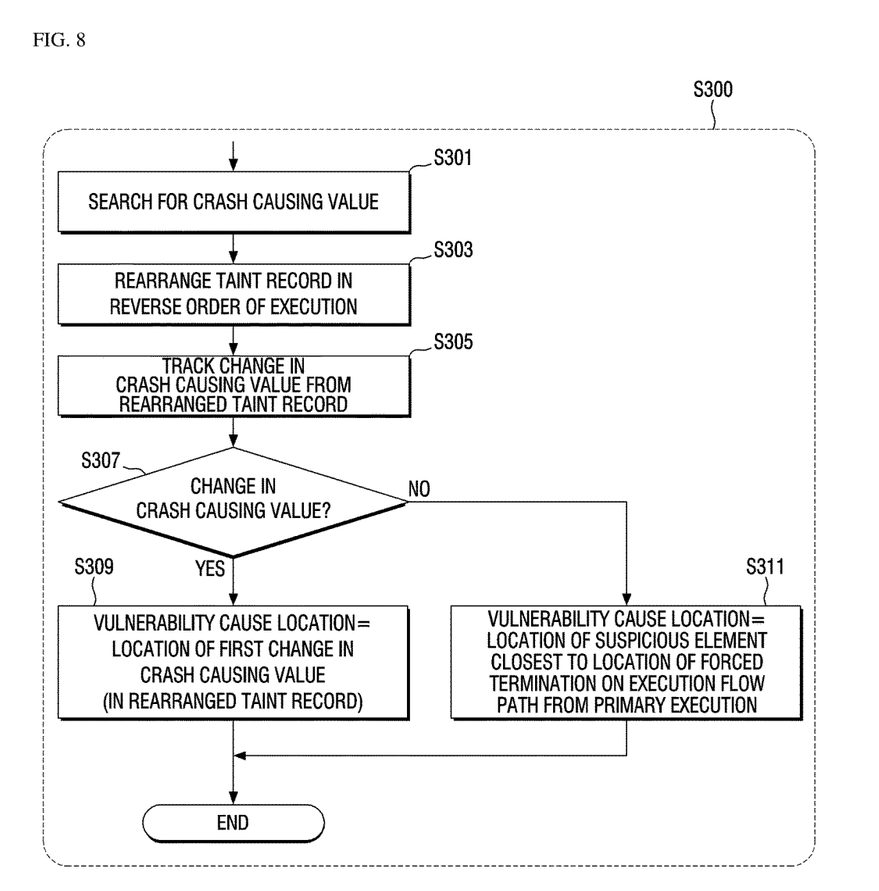
FIG. 8 is a detailed flowchart illustrating S300 of FIG. 3.

Referring to FIG. 8, in S301, a crash-causing value having caused a crash is searched for from the location of occurrence of a forced termination caused by the crash during the primary execution (i.e., from the memory address of an instruction forcefully terminated by the crash). In this case, a value recorded upon the occurrence of the forced termination during the taint analysis may be used.

In S303, a taint record created by the taint analysis is rearranged in the reverse order of execution. As a result, the crash-causing value may be placed at the front of the rearranged taint record. S303 is not necessarily a requisite, but can help identify any change in the crash-causing value.

In S305, a change in the crash-causing value is tracked. In S309, if a change in the crash-causing value is detected in S307, the location, in the rearranged taint record, where the crash-causing value changes for the first time is set as the location of the cause of a vulnerability.

On the other hand, in S311, if no change in the crash-causing value is detected or if the crash-causing value is unidentifiable, the location of a suspicious element closest to the location of occurrence of the forced termination on the execution flow path identified from the primary execution (i.e., the front of the rearranged taint record) is set as the location of the cause of a vulnerability, assuming that the crash has been caused not by a particular value, but by the action of a suspicious element.

When outputting information regarding the location of the cause of a vulnerability, information regarding a method to identify the cause of a suspicious element may be output by being matched to information regarding the type of vulnerability associated with the location of the suspicious element. If the information regarding the method to identify the cause of a suspicious element is "1", the information regarding the method indicates a backward trace (according to S309). If the information regarding the method to identify the cause of a suspicious element is "2", the information regarding the method indicates a suspicious element location (according to S311).

For example, if the location of an integer overflow vulnerability is found by tracing back the crash causing value, the following information may be output: [1, 0x40012b, Integer Overflow] where "1" denotes the method used to identify the cause of a suspicious element, "0x40012b" denotes the location of the cause of a vulnerability, and "Integer Overflow" denotes the type of the vulnerability.

A binary vulnerability analysis method according to another exemplary embodiment of the present disclosure will hereinafter be described with reference to FIG. 9. The binary vulnerability analysis method of FIG. 9 outputs data regarding the location of the cause of a crash. The binary vulnerability analysis method simply determines the location of the cause of a crash and may include performing a primary execution for taint analysis and identifying the location of the cause of a crash using a taint record obtained by the taint analysis.

Figure 9:
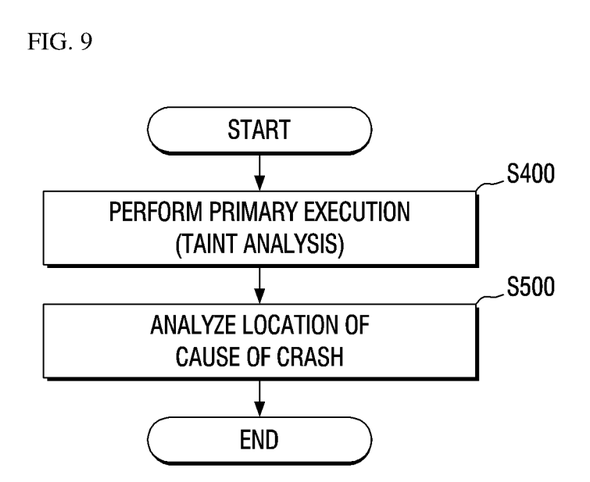
FIG. 9 is a flowchart illustrating a binary vulnerability analysis method according to another exemplary embodiment of the present disclosure.

Referring to FIG. 9, in S400, an execution flow path causing a crash to a target binary to be analyzed and a suspicious element on the execution flow path are recorded by performing taint analysis through the execution of the target binary. The above description of S100 of FIG. 4 may be applicable to S400.

In S500, if a taint record obtained by the taint analysis shows that there is no change in a crash causing value, which is the value of an operand at the time of a forceful termination caused by the crash, the location of a suspicious element closest to the location of occurrence of the forced termination on the execution flow path as the location of the cause of the crash. The above description of S5300 of FIG. 8 may be applicable to S500.

Figure 10:
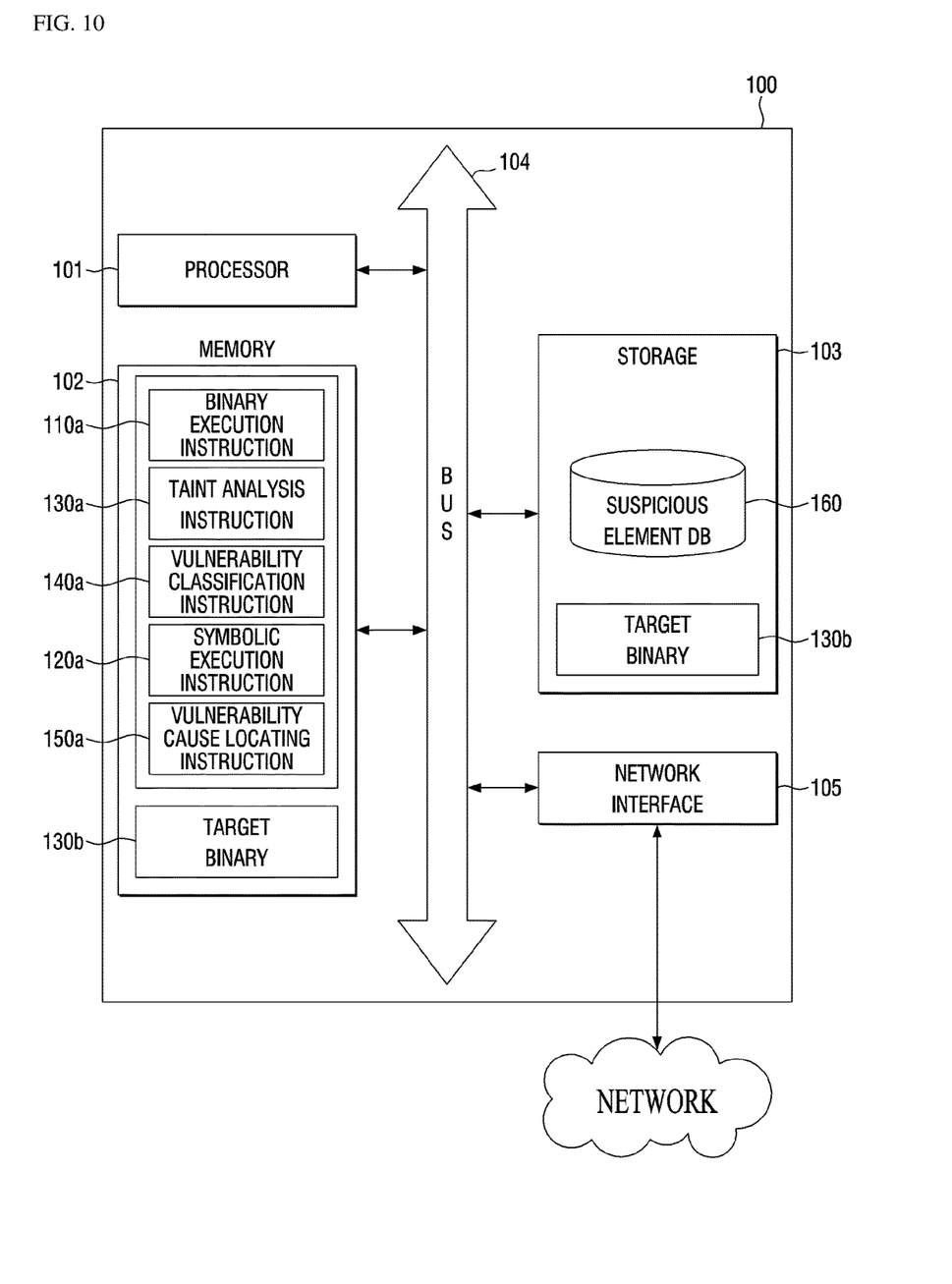
FIG. 10 is a block diagram illustrating the hardware configuration of a binary vulnerability analysis apparatus according to another exemplary embodiment of the present disclosure.

The structure and operations of a binary vulnerability analysis apparatus according to another exemplary embodiment of the present disclosure will hereinafter be described with reference to FIG. 10. Referring to FIG. 10, a binary vulnerability analysis apparatus 100 may include a processor 101 and a memory 102 and may further include at least one of a storage 103, a network interface 105, and a system bus 104. At least one instruction is loaded and stored in the memory 102 and may be executed by the processor 101. The binary vulnerability analysis apparatus 100 may perform the same operations as its counterpart of FIGS. 1 and 2 or may perform the binary vulnerability analysis methods of FIGS. 3 through 8 and 9.

The network interface 105 may receive a target binary 130b to be analyzed from an external device via a network and may allow the target binary 130b to be stored in the storage 103.

The at least one instruction may include: a binary execution instruction 110a inserting code for identifying the status of execution of the target binary 130b in the target binary 130b, loading the target binary 130a into the memory 102 as a target binary 130b, and executing the target binary 130b; a taint analysis instruction 130a performing taint analysis through the primary execution and outputting information regarding an execution flow path causing a crash to the target binary 130b; a vulnerability classification instruction 140a detecting a suspicious element on the execution flow path and generating a symbolic constraint for a vulnerability associated with the detected suspicious element; and a symbolic execution instruction 120a performing a secondary execution, which is a symbolic execution, on the execution flow path of the target binary 130b and, if an instruction satisfying the symbolic condition is found, notifying the vulnerability classification instruction 140a of the found instruction.

In one exemplary embodiment, the vulnerability classification instruction 140a uses a suspicious element DB 160 included in the storage 103 to detect a suspicious element on the execution flow path.

In one exemplary embodiment, the vulnerability classification instruction 140a may determine, upon being notified of the found instruction by the symbolic execution instruction 120a, that there exists a vulnerability in the target binary 130b by comparing the found instruction and the detected suspicious element.

In one exemplary embodiment, if a taint record obtained by the taint analysis shows that there is no change in a crash causing value, which is the value of an operand at the time of a forceful termination caused by the crash, the at least one instruction may further include a vulnerability cause locating instruction 150a of determining the location of a suspicious element closest to the location of occurrence of the forced termination on the execution flow path as the location of the cause of the vulnerability.

The concepts of the invention described above with reference to FIGS. 3 to 7 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A binary vulnerability analysis method performed by a computing device, the binary vulnerability analysis method comprising:
   a primary execution step of recording a symbolic constraint of a vulnerability associated with an execution flow path causing a crash to a target binary to be analyzed and a suspicious element on the execution flow path by performing taint analysis through a primary execution of the target binary; and
   a secondary execution step of performing a secondary execution after the primary execution step, which is a symbolic execution, on the execution flow path and, if an instruction satisfying the symbolic constraint recorded in the primary execution step is found, determining that the vulnerability exists in the target binary by comparing the suspicious element and the found instruction,
   wherein the primary execution step includes performing the primary execution using an execution parameter for executing the target binary and setting a taint source for the taint analysis using the execution parameter, and
   wherein setting the taint source comprises setting a loading location of the execution parameter during the primary execution as the taint source if "main" does not exist in a debug symbol of the target binary.

2. The binary vulnerability analysis method of claim 1, wherein the secondary execution step comprises determining that the vulnerability exists in the target binary if an instruction satisfying the symbolic constraint is found and if the found instruction is at the same location as the suspicious element.

3. The binary vulnerability analysis method of claim 1, wherein the secondary execution step comprises determining that the vulnerability exists in the target binary if the found instruction is executed after the execution of the suspicious element.

4. The binary vulnerability analysis method of claim 1, wherein the second execution step includes performing the secondary execution only on the execution flow path of the target binary.

5. The binary vulnerability analysis method of claim 1, wherein
the primary execution step comprises recording tainted elements, which include tainted operands, tainted memory addresses, and tainted registers, using information output as a result of the taint analysis and determining at least some of the tainted elements as suspicious elements, and
the determining the at least some of the tainted elements as suspicious elements comprises converting the target binary into pseudo code and determining tainted elements in a part of the pseudo code that match a previously-stored pseudo code pattern as suspicious elements.

6. The binary vulnerability analysis method of claim 1, wherein
the primary execution step comprises recording tainted elements, which include tainted operands, tainted memory addresses, and tainted registers, using information output as a result of the taint analysis and determining at least some of the tainted elements as suspicious elements, and
the determining the at least some of the tainted elements as suspicious elements comprises determining tainted elements that match a previously-stored suspicious operand pattern as suspicious elements.

7. The binary vulnerability analysis method of claim 1, wherein
the primary execution step comprises recording tainted elements, which include tainted operands, tainted memory addresses, and tainted registers, using information output as a result of the taint analysis and determining at least some of the tainted elements as suspicious elements, and
the determining the at least some of the tainted elements as suspicious elements comprises determining tainted elements that match a previously-stored suspicious instruction pattern as suspicious elements.

8. The binary vulnerability analysis method of claim 1, further comprising:
a vulnerability cause locating step of determining a first location on the execution flow path of a suspicious element closest to the location of the occurrence of a forced termination caused by the crash and identifying the first location as the location of the cause of the crash if a taint record obtained by the taint analysis shows that there is no change in a crash causing value, which is the value of an operand at the time of the forceful termination.

9. The binary vulnerability analysis method of claim 8, wherein the vulnerability cause locating step comprises outputting the type of the location of the cause of the vulnerability by distinguishing a first type indicating a location where a change in the crash causing value takes place, closest to the location of occurrence of the forced termination, and a second type indicating the location of the suspicious element closest to the location of occurrence of the forced termination.

10. A non-transitory computer-readable recording medium storing instructions which, when executed by a computing device, implement the binary vulnerability analysis method of claim 1.

11. A binary vulnerability analysis method performed by a computing device, the binary vulnerability analysis method comprising:
recording an execution flow path causing a crash to a target binary to be analyzed and a suspicious element on the execution flow path by performing taint analysis through the execution of the target binary;
determining a first location on the execution flow path of a suspicious element closest to the location of the occurrence of a forced termination caused by the crash; and
identifying the first location as the location of the cause of the crash if a taint record obtained by the taint analysis shows that there is no change in a crash causing value, which is the value of an operand at the time of the forceful termination,
wherein recording the execution flow path further comprises executing the target binary using an execution parameter for executing the target binary and setting a taint source for the taint analysis using the execution parameter, and
wherein setting the taint source comprises setting a loading location of the execution parameter during the primary execution as the taint source if "main" does not exist in a debug symbol of the target binary.

12. An electronic device comprising:
a processor; and
a memory storing at least one instruction to be executed in the processor and at least one target binary to be analyzed,
wherein the at least one instruction includes:
a first instruction of inserting code for identifying the status of execution of the at least one target binary in the at least one target binary and executing the at least one target binary,
a second instruction of performing taint analysis through a primary execution of the at least one target binary and outputting information regarding an execution flow path causing a crash to the at least one target binary,
a third instruction of detecting a suspicious element on the execution flow path and generating a symbolic constraint for a vulnerability associated with the detected suspicious element, and
a fourth instruction of performing a secondary execution, which is a symbolic execution, on the execution flow path of the at least one target binary and, if an operand satisfying the symbolic condition is found, notifying the third instruction of the found operand,
wherein, if an instruction satisfying the symbolic condition is found, the third instruction determines, upon being notified of the found instruction by the fourth instruction, that there exists a vulnerability in the at least one target binary based on a result of comparing the found instruction and the suspicious element,
wherein executing the at least one target binary further comprises executing the at least one target binary using an execution parameter for executing the target binary and setting a taint source for the taint analysis using the execution parameter, and
wherein setting the taint source comprises setting a loading location of the execution parameter during the primary execution as the taint source if "main" does not exist in a debug symbol of the at least one target binary.

13. The electronic device of claim 12, wherein if a taint record obtained by the taint analysis shows that there is no change in a crash causing value, which is the value of an operand at the time of a forceful termination caused by the crash, the at least one instruction may further include a fifth instruction of determining the location of a suspicious element closest to the location of occurrence of the forced termination on the execution flow path as the location of the cause of the vulnerability.

\* \* \* \* \*